3,008,907
Patented Nov. 14, 1961

3,008,907
THERMO-SETTING PHENOL-ALDEHYDE RESIN ADHESIVE COMPOSITION, EXTENDER BASE THEREFOR, AND METHOD OF PREPARING SAME
Robert M. Williams, Seattle, Wash., assignor to American-Marietta Company, Seattle, Wash., a corporation of Illinois
No Drawing. Filed Mar. 4, 1959, Ser. No. 797,043
18 Claims. (Cl. 260—7)

The present invention relates to the production of a resin adhesive composition containing a unique extender, and the utilization thereof in a resin adhesive composition.

It is known to prepare an extender base by treating a comminuted vegetable material selected from the group of materials consisting of tree bark, nut shells, and the endocarps of drupes, with an aqueous alkaline solution as, for example, a solution of sodium hydroxide, and heating the resulting product until interaction between the alkaline solution and the vegetable material is substantially complete. The so-prepared extender base is then mixed with a solution of a thermo-setting phenol-aldehyde resin to produce the final adhesive composition or glue.

A glue prepared as set forth has two undesirable characteristics. More specifically, when the adhesive composition which comprises a liquid phase, namely, the aqueous solution of the thermosetting phenol-aldehyde resin, and the solid phase, namely, the vegetable extender base, is used on the glue spreader for application to plywood veneers or the like, an undesirable separation occurs between the solids phase and the liquid phase of the glue; that is, the bark solids separate from the glue. In other words, the liquid material of the adhesive composition is spread on the plywood veneer but the solid material as, for example, the bark fraction treated as above set forth, tends to accumulate on the spreader rolls and in the adhesive reservoir, and is distributed unevenly on the veneer, resulting in an adhesive mix being spread on the veneer having a variable extender content. This "separation" of the extender base of the adhesive composition is undesirable. Such "separation" can be approximately demonstrated by using a printer's brayer roll and evenly applying thereto a quantity of the adhesive composition. Thereafter, the roll is continuously applied to the veneer until the roll is dry. At this point there will be a substantial quantity of the extender solids still remaining on the roll. Further, when applied to some stocks, an adhesive composition containing an extender prepared as set forth is characterized by "migration," that is, the departure of the liquid phase containing the thermosetting phenol-aldehyde resin component away from the glue line upon the spreading of the glue on the plywood or other stock, producing what is known as a "starved" glue line or glue joint.

It is an object of the present invention to provide an adhesive composition or glue which does not have said undesirable characteristics.

It is a further object of the invention to provide an extender base material for incorporation in an adhesive composition which eliminates or minimizes in the adhesive composition "separation" and "migration."

Another object of the invention is to provide an extender base which while eliminating or inhibiting "separation' and "migration" characteristics in the final adhesive composition, produces an adhesive composition which has desirable viscosity characteristics.

In accordance with the present invention, there is provided an extender base material adapted to be incorporated in an adhesive composition, said base material comprising an alkali metal reaction product of a conjointly cooked aqueous alkaline mixture of a cereal flour and a vegetable material which may be a ligno-cellulose material and especially a ligno-cellulose material selected from the group of ligno-cellulose materials consisting of tree bark, nut shells, and the endocarps of drupes.

More specifically in accordance with the present invention, there is provided a method of producing a base extender material comprising forming a mixture of a cereal flour as, for example, wheat flour; comminuted uncooked vegetable material which may be a ligno-cellulose material, said ligno-cellulose material being preferably selected from the group of ligno-cellulose materials consisting of tree bark, nut shells, and the endocarps of drupes; and an aqueous solution of an alkali metal compound which has an alkaline reaction in aqueous solution; and heat-reacting and effecting substantially complete chemical reaction between the alkali metal compound, the cereal flour, and the ligno-cellulose material.

The present invention will be illustrated by the following examples:

*Example 1*

There is provided a jacketed mixer vessel, said jacket being capable of having steam passed therethrough to heat the mix being treated, or having water passed therethrough to cool the mix. Into the jacketed mixer vessel, there is introduced 400 pounds of water having a temperature of at least 185° F. This water is mixed with 100 pounds of tree bark fraction, namely, Silvacon 472, said tree bark fraction being more particularly identified hereinafter, and 50 pounds of wheat flour functioning as a filler for the final adhesive composition.

The above constituents are thoroughly mixed. The time of mixing may vary with the amounts of ingredients but in the present example, the above ingredients were mixed for two minutes. Thereafter, there is added 50 pounds of soda ash, and the resulting mass is again mixed for a period of two minutes. There is then added a solution prepared by mixing 40 pounds of flake caustic soda with 40 pounds of water to provide 80 pounds of a liquid 50% caustic soda. The resulting mass is then agitated for a period of two minutes and then 100 pounds of water is added, the water having a temperature of 185° F. The so-treated mass is then agitated or mixed for a period of one minute and 50 pounds of additional tree bark fraction, namely, Silvacon 472, is added as a filler.

The so-prepared premix is cooked at a temperature of about 190° to 200° F. for a period of time to effect substantially complete chemical reaction between the alkali component of the mixture, the tree bark material, and the wheat flour filler. The heat reaction in this particular example is carried out for a period of 20 minutes at a temperature of 190° to 200° F., steam being introduced in the jacket of the mixer vessel if necessary. The mix is then cooled to about 120° F., and an antifoaming agent, such as diesel or stove oil, is then added in an amount up to 4 pounds. Thereafter, the resulting mass is mixed for a period of 5 minutes and then an aqueous solution of a phenol-aldehyde resin is added thereto in an amount of 500 pounds. In this particular example, a low condensed phenol-formaldehyde resin was added, such as those disclosed in U.S. Patents Nos. 2,462,252 and 2,462,-253. After the addition of the phenol-formaldehyde resin, the resulting mass is further mixed and cooled to a temperature between 80° and 90° F. To accelerate cooling, water is introduced in the jacket of the mixer vessel.

Referring to Example 1, the bark fraction contains a substantial portion of lignin compounds and the alkaline solution produced as set forth will react therewith and also react with the cereal flour, namely, the wheat flour, and these constituents probably interact when heat-treated at temperatures above about 150° F. should be sufficient for complete reaction to occur between the mix constituents. The time for complete cooking or reaction to occur between the mix constituents will depend on the amounts of the ingredients, the degree of heat employed, the particle size of the ligno-cellulose material, and to some extent the amount of alkali used. In the example set forth, the reaction time is about 20 minutes when the temperature of the mix is maintained between 190° and 200° F. However, it is desired to point out that the time of cook will vary, the criterion being always that there should be substantially complete reaction between the cereal flour as, for example, the wheat flour, and the comminuted vegetable material as, for example, the bark fiber, and also substantially complete interaction between the conjointly produced reaction masses. In connection with the conjoint reaction between the vegetable material as exemplified by the ligno-cellulose material such as bark particles, the finer the bark particles, the faster will be the reaction thereof with the cereal flour and the alkali metal compound. Therefore, shorter reaction times or lower reaction temperatures may be employed when a more finely ground bark material is used. Illustratively, the particle size of the bark is 70–75% passing through a 200 mesh screen or sieve. The particle size of the bark may be materially departed from; either finer or coarser particles being utilized in providing the unique extender of the present invention by conjointly cooking comminuted ligno-cellulose such as bark and its equivalent with a cereal flour in the presence of an alkaline metal compound which has an alkaline reaction in aqueous solution as, for example, sodium hydroxide or a mixture of sodium hydroxide and sodium carbonate. It may be pointed out that if the tree bark is cooked in an aqueous alkaline medium and a cereal flour as, for example, wheat flour, is then added to the cooked bark premix after the premix has been cooled as, for example, to 120° F. or lower, that when the resulting extender product is incorporated in an aqueous composition, the latter tends to "separate" and when applied to some stocks, to "migrate," and further the addition of the cereal flour to the already cooked bark premix produces an increase of viscosity in the adhesive composition which is undesirable. On the contrary, when in accordance with the present invention the comminuted tree bark and the cereal flour are conjointly cooked and conjointly interacted as set forth, the resulting extender when incorporated in an adhesive eliminates or inhibits "separation" and "migration" and there is little, if any, increase in viscosity of the adhesive composition containing the extender material of the present invention as compared to a comparable adhesive composition which contains an extender which comprises straight cooked vegetable material, such as tree bark material.

It is desired to point out that the adhesive compositions containing the extender of the present invention may utilize any of the thermosetting phenol-aldehyde resin reaction products of the prior art, including the high as well as the low molecular weight thermosetting phenol-aldehyde resins as, for example, a phenol-formaldehyde resin condensation product, said products being prepared as well known in the prior art. The high molecular weight thermosetting phenol-aldehyde resin condensation products are usually prepared by forming an aqueous mixture of a monohydric phenol selected from the group consisting of phenol, cresol, and xylenol, and an inorganic catalyst accelerating the formation of the resin-reaction product on heating, said catalyst being any of the prior art catalysts including sodium hydroxide, that is, caustic alkali. In the prior art the catalyst when expressed as equivalent sodium hydroxide is usually present in an amount equivalent to not over 10% of the total mix constituents. The components such as set forth are heat-reacted until the thermosetting phenol-aldehyde resin is produced. This resin is usually the salt of the resin and, therefore, is soluble in aqueous alkaline solution. Referring to the phenol-aldehyde resin condensation products which may be incorporated in an adhesive composition carrying the extender of the present invention, it is desired to point out that the resin solids content of the resin condensation product in its aqueous alkaline solution may vary between about 25% and about 55%, although in some cases the resin solids content may be lower as, for example, 20%. This is set forth as illustrative and not by way of limitation since, as stated, any of the prior art including those produced in accordance with the disclosure of Redfern Reissue Patent No. 23,347 and U.S. Patents No. 2,631,097 and No. 2,631,098.

While it is preferred in accordance with the present invention that the improved extender base be incorporated in an adhesive composition containing a thermosetting phenolaldehyde resin condensation product, it is, of course, within the province of the invention to incorporate the unique extender base material of the present invention in other adhesives as, for example, in an adhesive employing as an adhesive component a urea-aldehyde resin or a melamine-aldehyde resin.

The following is an additional example illustrating the present invention:

*Example 2*

There is provided a jacketed mixer vessel, said jacket being capable of having steam passed therethrough to heat the mix being treated, or having water passed therethrough to cool the mix. Into the jacketed mixer vessel there is introduced 145 parts of water having a temperature of at least 185° F. This water is mixed with 50 parts of tree bark fraction, namely, Silvacon 472. The above ingredients are mixed for a period of two minutes and then 55 parts of 50% sodium hydroxide, that is, caustic soda, is added. The resulting mass is further mixed or agitated for a period of two minutes and then 30 parts of tree bark fraction, namely, Silvacon 472, is added. There is also added 10 parts of wheat flour, known in the cereal flour art as "Bulzie" wheat flour. The so-prepared premix is cooked at a temperature of about 210° to 212° F. for a period of about 20 minutes which effects substantially complete chemical reaction between the alkali component of the mixture, the tree bark material, and the wheat flour filler. The mix then starts to cool and the cooling mix there is added two parts of diesel oil functioning as an antifoam agent. The mix is then cooled to about 140° F. when 14½ parts of soda ash, that is, sodium carbonate is added. Instead of adding sodium carbonate, sodium bicarbonate may be added. The resulting mass is then agitated for a period of 5 minutes. Thereafter, there is added a thermosetting phenol-formaldehyde resin in an amount of 500 pounds, said resin being produced in accordance with the disclosure of Redfern Reissue Patent No. 23,347. This resin is added in the form of an aqueous alkaline solution thereof. What is added is a solution of alkali salt of the thermosetting phenol-formaldehyde resin. The resulting adhesive composition is suitably cooled as, for example, to a temperature between 80° and 90° F.

The following is an additional example illustrating the present invention:

*Example 3*

There is provided a jacketed mixer vessel, said jacket being capable of having steam passed therethrough to heat the mix being treated, or having water passed therethrough to cool the mix. Into the jacketed vessel there is introduced 169 parts of water at a temperature of 200° F.; 32 parts of 50% sodium hydroxide, that is, caustic alkali; 85 parts of walnut shell flour; 15 parts of wheat flour; and 20 parts of soda ash, that is, sodium carbonate. The resulting mass is well mixed and then heated for a period of 20 minutes at 180° F. The alkaline solution will react with the wheat flour and also react with the walnut shell flour, and probably these reaction products conjointly interact. After a time reaction is effected to completely interact the mix constituents, the resulting mixture is cooled at 120° F. Thereafter, ½ part of diesel oil functioning as an antifoaming agent is added, and then 100 parts of a thermosetting phenol-formaldehyde resin condensation product, the latter being produced in accordance with the disclosure of Redfern Reissue Patent No. 23,347. After the initial addition of the resin, the resulting mass is again agitated until a substantially smooth mass is produced and then there is added an additional amount of said thermosetting phenol-formaldehyde resin, namely, 355 parts thereof. Upon the second addition of the resin, the resulting mix is again agitated to produce the final adhesive composition.

In the examples set forth, the unique extender of the present invention is in liquid form before there is added thereto the resin component. However, in a modified form of the invention the extender base material may be dried, ground to a powder, and packaged. The dried extender material after alkaline cooking, may then be combined with any prior art resin component to produce the final adhesive composition adapted to be used in the production of plywood.

In general, it may be stated that while the bark of quite a number of trees may be used to produce the vegetable material utilized in carrying out the present invention, the bark of certain of the coniferous trees give especially good results. These trees include the firs, exemplified by the Douglas fir, the pines, the cedars and the hemlocks. In general, the barks of trees comprise cork, phelloderm, and the parenchyma tissue and sclerenchyma tissue of the bark phloem. Pieces of bark taken from different trees show a wide variation in relative amounts of cork and phloem, grading from pieces consisting almost entirely of phloem and having but thin lunes of cork to those consisting of large masses of cork with small islands of phloem existing in the cork.

The phellem or cork is composed of non-elongated thin and thick walled cells converted into cork tissue by development of suberin.

The following are additional illustrative examples of a glue produced in accordance with the present invention, there being utilized in each example a jacketed mixer vessel capable of having steam passed through the vessel to heat the mix being treated or having water passed therethrough to cool the mix.

*Example 4*

The following ingredients were introduced into the jacketed mixer vessel in the order and quantity hereinafter enumerated, the procedural steps including mixing and heating being set forth below:

| | Gms. |
|---|---|
| Water at room temperature | 400 |
| Silvacon 472G (fine ground, 70–75% through 200 mesh screen or sieve) | 100 |
| Wheat flour | 50 |
| Mix 2 minutes. | |
| Soda ash | 50 |
| Mix 1 minute. | |
| Sodium hydroxide solution (50% NaOH in water) | 80 |
| Mix 2 minutes. | |
| Water at room temperature | 100 |
| Mix 1 minute. | |
| Silvacon 472G (of particle size above enumerated) | 50 |
| Heat to 150° F. while agitating and hold at 150° F. for 5 minutes, then cool to 120° F. | |
| Diesel oil | 4 |
| Cool to 77° F. | |

Phenol-formaldehyde condensation resin produced in accordance with the teachings of Patent No. 2,462,253 to Booty et al., said resin having a molar ratio of formaldehyde to phenol of 1.85:1, the constants of the finished resin being:

| Constant— | Value |
|---|---|
| Percent solids | 50.5 |
| Percent NaOH | 2.15 |
| Specific gravity 25°/25° | 1.175 |
| Viscosity (Gardner-Holdt system) | W–X |

*Example 5*

The phenol-formaldehyde resin adhesive composition containing the wheat flour was produced in the manner identical with Example 4 with the exception that the cooking step was carried out for a period of 25 minutes at 150° F.

*Example 6*

The phenol-formaldehyde resin adhesive composition containing the wheat flour was produced in the manner identical with Example 4 with the exception that the cooking step was carried out for a period of 5 minutes at 212° F.

*Example 7*

The phenol-formaldehyde resin adhesive composition containing the wheat flour was produced in the manner identical with Example 4 with the exception that the cooking was carried out for a period of 25 minutes at 212° F.

*Example 8*

| | Gms. |
|---|---|
| Water at 185° F. | 400 |
| Silvacon 472 (ground so that about 50% passes through a 200 mesh screen or sieve) | 150 |
| Mix 2 minutes. | |
| Soda ash | 50 |
| Mix 1 minute. | |
| Sodium hydroxide solution (50% NaOH in water) | 80 |
| Mix 2 minutes. | |
| Water at 185° F. | 100 |
| Mix 1 minute. | |
| Silvacon 472 (of particle size above enumerated) | 50 |
| Heat to 190° F.–200° F. and cook for 20 minutes, cool to 120° F. | |
| Diesel oil | 4 |
| Cool to 77° F. | |

Phenol-formaldehyde condensation resin produced in accordance with the teachings of Patent No. 2,462,253 to Booty et al, said resin having a molar ratio of formaldehyde to phenol of 1.85:1, the constants of the finished resin being:

| Constant— | Value |
|---|---|
| Percent solids | 50.5 |
| Percent NaOH | 2.15 |
| Specific gravity 25°/25° | 1.175 |
| Viscosity (by Gardner-Holdt system) | W–X |

Example 8 illustrates the production of a phenolformaldehyde resin adhesive composition in which there is no conjoint alkaline cooking of the vegetable material such as bark and a cereal flour. When plywood is produced utilizing as the adhesive the glue of Example 8 the glue will excessively penetrate into the surface of the plywood core. Further, the glue produced in accordance with Example 8 will show a substantial migration away from the glue line, this resulting in the production of plywood with a weaker bond.

When the glue set forth in Example 8 is utilized in the production of 7/16" plywood, the plywood pressed at a platen temperature of 285° F. for 3¾ minutes and at a pressure on the plywood panel of 175 p.s.i., the resulting pressed plywood panel showed a lower percentage of wood failure as compared to the wood failure resulting from plywood panels produced using the unique extender base of the present invention and the unique resin adhesive containing said extender base, the latter having a comminuted bark material and the cereal flour conjointly cooked in an alkaline medium prior to the mixture thereof with a resin component.

The following table is illustrative of the bark composition of certain coniferous trees of commerce:

|  | Douglas Fir, percent | Western Hemlock, percent | White Fir (Abies concolor), percent | Ponderosa Pine, percent |
| --- | --- | --- | --- | --- |
| I. Cork | 25 | 5 | 40 | 5 |
| II. Phloem: |  |  |  |  |
| A. Sclerenchyma Tissue— |  |  |  |  |
| (1) Fiber | 40 |  |  |  |
| (2) Stone Cells |  | 45 | 45 |  |
| B. Parenchyma Tissue—(1) Most sieve tubes; also food storage cells, connecting cells and ray tissue | 35 | 50 | 15 | 50 |
| III. Phelloderm |  |  |  | 45 |

The barks of trees may be comminuted and differentially separated by appropriate treatment into certain fractions, as set forth in Anway Patents No. 2,437,672 and No. 2,446,551, and Grondal et al. Patent No. 2,627,375. Silvacon 472 defines a tree bark composition which comprises lignified fibers, parenchyma tissue, and same cork, it being preferred that the cork be not greater than 20%. In carrying out the examples, the Silvacon 472 may comprise about 40% lignified fiber, 40% parenchyma tissue powder, and 20% cork, although there may be obviously substituted therefor other tree bark fractions or compositions, natural or produced by concentration processes, as hereinafter pointed out. The lignified fibers and the parenchyma tissue powder represent the phloem constituents and the cork represents a non-phloem constituent. Instead of using Silvacon 472, there may be substituted therefor an amorphous parenchyma tissue powder. Another bark tree fraction which may be used in carrying out the invention is one comprising about 70% to 75% lignified fibers and 20% to 25% cork. It is not desired to be limited to any particular tree bark fraction. The comminuted tree bark contains lignin in a major proportion and any fraction of the comminuted tree bark, natural or produced by a process of concentration, which comprises lignin in a substantial proportion, or any mixture of the lignin components of the tree bark may be used in carrying out the invention, it being preferred, however, that the cork be present in an amount less than 20%. In carrying out the present invention, good results are obtained when the vegetable material comprises chiefly the non-fibrous component of bark phloem.

In carrying out the present invention, the ligno-cellulose material, as exemplified by bark, herein set forth, may be the Silvacon 472 bark of commerce which is generally produced in ground form in such a particle size that about 50% of the material will pass through a 200 mesh screen or sieve.

A ligno-cellulose material such as bark, ground to a finer size, is equally useful for some industrial applications, the finer ground bark is superior because it requires less cooking time and less alkaline metal compound can be used in the conjoint cooking operation. A typical more finely ground ligno-cellulose bark material is one in which about 70%–75% of the bark material will pass through a 200 mesh screen or sieve.

Representative endocarps or stones of drupes which may be used in combination with a cereal flour as previously pointed out, are apricot, peach, and prune stones.

In general, instead of using wheat flour as a constituent of the extender mix, other cereal flours may be used including those produced from rye, barley, oats, rice, and the like.

In carrying out the present invention, there may be substituted for the walnut shell flour any of the prior art nut shell flours, including cashew nut shell flour. Further, for the tree bark vegetable material or for the nut flour, there may be substituted an agricultural residue filler, such as "Furafil," which is the residue from the production of furfural from corn cobs. The corn cobs are ground and heated under pressure with an acid which hydrolyzes the pentosans to furfural. The ligno-cellulose residue is dried and further ground. The tree bark material, nut shells, the endocarps of drupes and the furfural residue may be defined under the generic term of ligno-cellulose material. The cereal flour may be conjointly cooked with any of these ligno-cellulose materials, all of them containing a substantial proportion of lignin.

As previously stated, the principal weakness in the past of glue mixes containing a bark-type extender and a thermosetting phenol-aldehyde resin and particularly a low molecular weight phenol-aldehyde resin, was that the glue showed severe separation of the liquid phase of the glue from the solids of the glue, and on some types of stock, exhibited a strong tendency to migrate, that is, flow of the entire glue system away from the glue line. The prior art manner in which this was corrected was to thicken the glue by suitable additive, such as a cereal flour, the most commonly used flour being wheat flour.

Illustrative thereof, it may be stated that if the glue composition is formulated as in Example 1, but the 50 parts of wheat flour is added after the cooking and cooling of the mix and before the addition of the resin component, the following viscosities are obtained:

|  | Initial | After 24 hours |
| --- | --- | --- |
| #26 wire MacMichael (MM) viscosity | 114 | 300+ |
| 550 r.p.m. high shear viscosity | 6.1 | 7.4 |

It is to be noted that after 24 hours, the MM viscosity was beyond the range of the testing instrument. In other words, there had been a very high increase in viscosity after the glue had stood for a period of 24 hours. If the formulation in Example 1 is used, all of the filler is the tree bark fraction and if 200 parts of Silvacon 472 is only used as the extender, the following viscosities are obtained:

|  | Initial | After 24 hours |
| --- | --- | --- |
| #26 wire MacMichael (MM) viscosity | 35 | 78 |
| 550 r.p.m. high shear viscosity | 5.0 | 6.6 |

While the use of the tree bark fraction in an aqueous alkaline solution does result in a glue which has a fairly stable viscosity, the resulting glue still is characterized by separation of the liquid phase of the glue and on some types of stock, the glue migrates.

However, if the extender formulation is as in Example 1 where 50 parts of wheat flour has been substituted for 50 parts of Silvacon 472, and both the wheat flour and the tree bark extender components cooked together in aqueous alkaline solution, as herein set forth in detail, the resulting glue has the following viscosities:

|  | Initial | After 24 hours |
| --- | --- | --- |
| #26 wire MacMichael (MM) viscosity | 45 | 85 |
| 1,300 r.p.m. high shear viscosity | 6.0 | 6.8 |

Further, this glue is characterized by little separation of the liquid phase of the glue, and the migration of the glue is substantially inhibited.

In view of the above, it is clear that the cooking together of the ingredients results in a glue which has a stable viscosity after 24 hours' standing and especially a stable MM viscosity.

It may be stated that experiments were carried out wherein the tree bark extender component, namely, Silvacon 472, was cooked in alkaline solution having a concentration within the limits herein set forth and then wheat flour was cooked in an aqueous alkaline solution, and the two precooked ingredients were introduced into a standard glue mix containing a thermo-setting phenol-aldehyde resin. The initial MM viscosity of the glue was 127 and after 18 hours, this viscosity had risen to 213. The high shear viscosity obtained at 550 r.p.m. was initially 5.6 and after 18 hours cooking was 6.0. This conclusively shows that separate cooking of the extender fillers and the mixing thereafter does not produce the desired results. In other words, the vegetable material, exemplified by tree bark, nut shells and the endocarps of drupes, and the cereal flour must be conjointly cooked in an alkaline solution so that the constituents can interact and in this manner not only stabilize the viscosity and especially the MM viscosity, but also inhibit or substantially eliminate separation and migration.

In Examples 1 and 4 to 7, inclusive, the ratio of the tree bark material to the cereal flour, and more particularly, the wheat flour, is 3:1. In Example 2, the ratio is 8:1 and in Example 3, the ratio is about 5.6:1. In general, in preparing the composite extender of the present invention the proportion of vegetable material to the cereal flour may range from 3:1 to 8:1. These are illustrative ratios and may be somewhat departed therefrom, it being preferred to employ a major proportion of vegetable material in relation to the proportion of vegetable material in relation to the proportion of cereal flour. Functionally stated, there must be enough cereal flour, such as wheat flour, rye flour, barley flour, oat flour, and the like, present in the glue mix to inhibit "separation" and reduce migration when these two ingredients are conjointly heat-treated, interacted, or cooked at a temperature range above about 140° to 150° F., said heat-reaction being a time reaction to allow for complete interaction between the constituents of the extender composition.

As herein set forth, the extender ingredients are heat-reacted or cooked in an alkaline solution. This alkaline solution may comprise an aqueous solution of a hydroxide, a carbonate, and/or bicarbonates or the alkali metals, such as sodium and potassium. Sodium hydroxide and sodium carbonate are the ingredients which are usually used to produce the alkaline medium. If desired, the sodium hydroxide may be generated in situ in the aqueous extender composition. Illustrative thereof, a dry mixture of calcium hydroxide and sodium carbonate may be sold to plywood mills and this mixture may be used to produce the alkaline solution formulated along the lines of the illustrated examples set forth. Sodium hydroxide or caustic is somewhat deliquescent, and this presents difficulties in handling and shipping. Therefore, it may be desirable under certain circumstances to furnish the plywood mills with a mixture of calcium hydroxide and sodium carbonate which may be utilized at the time the adhesive compositoin is made. Upon the addition of water in a formulation similar to the examples herein set forth, the sodium carbonate and calcium hydroxide generate sodium hydroxide by a process of double decomposition.

In the examples set forth, instead of using a mixture of soda ash and caustic soda, caustic soda only may be used to produce the alkaline solution which contains an alkali metal compound. When sodium hydroxide and sodium carbonate are both used to produce the alkaline solution to which the vegetable material and the cereal flour are added and then conjointly cooked in the presence of said solution, the amounts of the sodium hydroxide and sodium carbonate may vary greatly. In Example 1 the ratio of the dry soda ash used to dry caustic is 5:4. In Example 2 the ratio of the caustic to the soda ash, sodium carbonate or sodium bicarbonate is about 2:1, and in Example 3 the ratio of the dry caustic to the sodium carbonate is 16:20. The 50% caustic solution furnishes 16 parts of 100% caustic. In Examples 4 to 7, the ratio of the dry caustic to the soda ash is 4:5. Referring to Example 2 it is to be noted that the conjoint cooking of the tree bark and wheat flour is carried out in a sodium hydroxide solution. The amount of the alkaline materials which are used to react with the vegetable material and the cereal flour of the extender base and the strength of the alkaline solution into which the reaction occurs, may vary greatly depending upon the character of the vegetable material and the cerial flour and the amount thereof. Desirably, the vegetable material as, for example, the tree bark and the cereal flour, exemplified by wheat flour, are cooked in 8 to 20% solution of an alkali metal compound which has an alkaline reaction in aqueous solution. It is desired to point out that the aqueous solution contains a basic acting compound of an alkali metal. This basic acting compound may be introduced directly into the glue mix or may be generated in situ by double decomposition as previously set forth. Desirably, the alkali compound is selected from the group of alkali metal compounds consisting of hydroxides, carbonates and bicarbonates. While the strength of the alkaline solution is desirably as set forth, applicant does not desire to be limited thereto as the essence of the invention herein set forth consists in providing an extender base material by conjointly cooking the vegetable material and the cereal flour in an alkaline solution to effect complete reaction between the mix constituents. The amount of resin, including urea-aldehyde resin, melamine-aldehyde resin, and the thermosetting phenol-aldehyde resin, present in the glue will vary greatly depending on the purpose for which the glue is used. The glue produced in Example 1 is especially adapted for the production of interior grade plywood. However, it has a rather substantial water resistance and mold resistance due to the presence of about 500 pounds of the liquid resin. If a glue is to be used as an exterior adhesive, it will have much more resin component.

The glues herein set forth may be used in the production of plywod and may be filmed onto the core or the cross-band veneers of the plywood in an amount between the limits of 45 pounds and 55 pounds per thousand square feet of glue line surface.

After the application of the adhesive composition or glue prepared as herein set forth, the panels are heated at a temperature customary in the plywood art as, for example, between 260° and 300° F. until the resin component of the glue is converted into its final form. When the adhesive composition contains a thermosetting phenol-aldehyde condensation product as, for example, a phenol-formaldehyde condensation product, the latter on the application of heat, as customary in the art, is converted into its insoluble infusible state.

Glues produced as herein set forth have been used in the production of plywood panels. Knife tests made on panels bonded with the glues of the present invention employing the conjointly cooked extender as herein set forth, were, in general, excellent. Knife test bonds on an extender comprising Silvacon 472 and wheat flour were, in general, better than the knife test bonds on a comparable glue employing only the Silvacon 472, that is, a tree bark fraction.

Similarly, knife test bonds on panels produced with the herein formulated glue utilizing walnut shell flour and wheat flour extender conjointly cooked as set forth, showed slightly more wood failure on the average than a comparable glue which only had walnut shell flour as an extender.

The MacMichael viscosity, herein abbreviated as MM, may be defined as follows: the viscosity reading in degrees which a sample produces when tested with a No. 26 wire spindle in a MacMichael rotating viscosimeter which turns at 20 r.p.m. The spindle used in carrying out the different viscosity tests is the standard MacMichael spindle, 9.4 mm. in diameter and immersed 4.8 centimeters in the material being tested.

The high shear viscosity, which may be abbreviated as HS, may be defined as the viscosity reading in centimeters produced on a Hercules high shear viscosimeter turning at a rate of 550 r.p.m. or at a rate of 1310 r.p.m., the high shear viscosity whenever specified stating the speed of rotation of the viscosimeter.

Referring to Example 1, the mixture of the vegetable material as, for example, tree bark, and the cereal flour as, for example, wheat flour is reacted in alkaline solution, the strength of which is equivalent to 12.18% sodium hydroxide. Referring to Example 2, the alkaline mixture has been formulated by adding a 50% sodium hydroxide solution to water and the cook is effected in a sodium hydroxide solution which has a concentration of 13.38%.

Referring to Example 3, the concentration of the alkaline solution, expressed in terms of equivalent sodium hydroxide, is 14.1%. It will be noted that in Examples 1 and 3 that not all of the sodium compound present is in the form of free sodium hydroxide. Thus, the concentration of the cooking solution in Example 1 on the basis of free sodium hydroxide is only 6.36%, the remaining proportion of alkali metal compound being present in the form of sodium carbonate. Again, in Example 3, the aqueous alkaline cooking liquor contains sodium carbonate in addition to sodium hydroxide.

In accordance with the present invention, the mixture of vegetable material and cereal flour is reacted in aqueous alkaline medium containing alkali metal compound at a temperature of 150° F. or above, said alkali metal compound being present in said aqueous alkaline solution in an amount between about 8% and about 20%.

More narrowly, the aqueous alkaline solution has present at least one alkali metal compound having an alkaline reaction in aqueous solution and having an alkali metal compound concentration equivalent to between about 12% and 14% of sodium hydroxide.

The proportion of resin present in the adhesive composition with respect to the dry weight of the filler, that is, the vegetable material plus the cereal flour, may vary considerably. Desirably, between 2.5 and 5.6 parts of resin may be employed for each part of dry filler, said resin being in the form of a solution of a thermosetting phenol-aldehyde condensation product as hereinbefore previously pointed out. This resin solution may contain between about 20% and 50 to 55% of resin solids, and usually contains between 20% and 28% of resin solids.

It will be appreciated that the proportion of resin solution of the character set forth with respect to the dry weight of the composite extender or filler may be widely varied and as little as one part of resin to six parts of filler, or as much as eight parts of resin per part of dry filler may be acceptable, depending upon the intended use of the adhesive composition. The proportion of resin to the total adhesive mixture may also vary considerably. The use of ⅓ part of resin solution per part of adhesive forms a satisfactory interior grade adhesive for plywood, while the use of ⅔ part of resin solution per part of adhesive forms a satisfactory exterior grade adhesive for plywood.

It is desired to point out that the aldehyde with which the phenol of the character herein set forth is reacted may comprise formaldehyde, acetaldehyde, benzaldehyde, propiolaldehyde, butylaldehyde, furfural aldehydes, and the like. Di-aldehydes may be used in place of the mono-aldehydes.

The vegetable material or the ligno-cellulose material and the cereal flour are illustratively and desirably conjointly cooked at atmospheric pressure between a temperature of about 150° F. and 212° F. A slightly higher temperature than 212° F. may desirably be used, this being due to the boiling point of the liquid component of the mixture. However, it is further desired to point out that, in general, the temperature at which said components are conjointly cooked should be such that the components will not be deleteriously affected or decomposed, or subjected to excessive hydrolytic action, including excessive hydrolysis of the cereal component and especially starch.

When the ligno-cellulose material is finely ground the mixture thereof with the cereal flour may be conjointly cooked in the presence of an alkaline medium including those herein set forth for a period of 5 minutes at a temperature of 150° F. and the resulting extender base when mixed with a resin as herein set forth produces a satisfactory plywood glue. The cooking may also be carried out for a period of time varying between 5 minutes and about 25 minutes at a temperature between about 150° and 212° F. or slightly higher. The time of alkaline cooking necessary to effect substantially complete interaction between the ligno-cellulose and the cereal material will vary with different types of ligno-cellulose and different kinds of cereal. Therefore, broadly, it is not desired to limit the time of conjoint alkaline cooking to about 25 minutes when utilizing a temperature of between about 150° and 212° F. or slightly higher. In other words, the time of alkaline cooking at a temperature range of between about 150° and 212° F. may be increased, depending on the character of the interacting ligno-cellulose and cereal material, the criterion being that there should be substantially complete interaction during the alkaline cooking of the ingredients of the extender composition, said time of cooking being such as to not only stabilize the viscosity, and especially the MM viscosity, of the final adhesive composition, but also inhibit or substantially eliminates separation or migration of the solid phase of the adhesive composition from the liquid phase thereof.

In some of the examples herein set forth, the temperature of the treatment water is defined as "room temperature." The latter may be defined as 20° C. or 68° F.

The present application is a continuation-in-part of my application Serial No. 481,477, filed January 12, 1955.

What is claimed is:

1. The method of preparing an extender base comprising forming a mixture of a comminuted ligno-cellulose material; a cereal flour; and an 8% to 20% aqueous solution of an alkali metal compound selected from the group of alkali metal compounds consisting of hydroxides, carbonates, a mixture of hydroxides and carbonates, and bicarbonates; there being present at least one part of cereal flour for each eight parts by weight of the ligno-cellulose material, and cooking the mixture between the temperature limits of about 150° F. and about 212° F. for a period of time of at least about 5 minutes.

2. The method of preparing an extender base comprising forming a mixture of a comminuted ligno-cellulose material; a cereal flour; and an 8% to 20% aqueous solution of an alkali metal hydroxide; there being present at least one part of cereal flour for each eight parts by weight of the ligno-cellulose material, and cooking the mixture between the temperature limits of about 150° F. and about 212° F. for a period of time of at least about 5 minutes.

3. The method of preparing an extender base comprising forming a mixture of a comminuted ligno-cellulose material; a cereal flour; and an aqueous alkaline solution having an alkali metal hydroxide concentration equivalent to between about 12% and about 14% of sodium hydroxide, and cooking the mixture between the temperature limits of about 150° F. and about 212° F. for a period time of at least about 5 minutes.

4. The method defined in claim 1 in which the ligno-cellulose material is tree bark.

5. The method defined in claim 1 in which the ligno-cellulose material is tree bark and the cereal material is wheat flour.

6. An extender base for incorporation in an adhesive composition, said extender base comprising the reaction product of a conjointly cooked aqueous alkaline mixture of a ligno-cellulose material; a cereal flour; and an 8% to 20% solution of an alkali metal compound selected from the group of alkali metal compounds consisting of hydroxides, carbonates, a mixture of hydroxides and carbonates, and bicarbonates; there being present at least one part of cereal flour for each eight parts by weight of the ligno-cellulose material, said mixture having been cooked between the temperature limits of about 150° F. and about 212° F. for a period of time of at least about 5 minutes.

7. An extender base for incorporation in an adhesive composition, said extender base comprising the reaction product of a conjointly cooked aqueous alkaline mixture of a ligno-cellulose material; wheat flour; and an 8% to 20% solution of an alkali metal compound selected from the group of alkali metal compounds consisting of hydroxides, carbonates, a mixture of hydroxides and carbonates, and bicarbonates; there being present at least one part of cereal flour for each eight parts by weight of the ligno-cellulose material, said mixture having been cooked between the temperature limits of about 150° F. and about 212° F. for a period of time of at least about 5 minutes.

8. The extender base defined in claim 6 in which the ligno-cellulose material is tree bark.

9. The extender base defined in claim 6 in which the ligno-cellulose material is coniferous tree bark and the cereal flour is wheat flour.

10. The extender base defined in claim 6 in which the ligno-cellulose material is selected from the group of materials consisting of tree bark, nut shells and the endocarps of drupes.

11. The method of producing an adhesive composition comprising forming a mixture of a comminuted ligno-cellulose material; a cereal flour; and an 8% to 20% aqueous solution of an alkali metal compound selected from the group of alkali metal compounds consisting of hydroxides, carbonates, a mixture of hydroxides and carbonates, and bicarbonates; there being present at least one part of cereal flour for each eight parts by weight of the ligno-cellulose material, cooking the mixture between the temperature limits of about 150° F. and about 212° F. for a period of time of at least about 5 minutes to thereby form a precooked extender base, and mixing therewith a thermosetting phenol-aldehyde resin solution having adhesive properties and containing resin solids between the limits of about 20% and about 55%, said resin solution being present in the adhesive composition in an amount taken on the dry weight of the combined ligno-cellulose material and cereal flour extender components between the limits of 1 part of the resin solution to 6 parts of said extender components, to 8 parts of the resin solution to 1 part of the extender components, whereby there is produced an adhesive composition having liquid and solid phases, the solid phase of the adhesive composition having little tendency to separate from the liquid phase thereof, and the latter having little tendency to migrate from the glue line of the material to which the adhesive composition is applied.

12. The method of producing an adhesive composition comprising forming a mixture of a comminuted ligno-cellulose material; a cereal flour; and an aqueous alkaline solution having an alkali metal hydroxide concentration equivalent to between about 12% and about 14% of sodium hydroxide; there being present at least one part of cereal flour for each eight parts by weight of the ligno-cellulose material, cooking the mixture between the temperature limits of about 150° F. and about 212° F. for a period of time of at least about 5 minutes to thereby form a precooked extender base, and mixing therewith a thermosetting phenol-aldehyde resin solution having adhesive properties and containing resin solids between the limits of about 20% and about 55%, said resin solution being present in the adhesive composition in an amount taken on the dry weight of the combined ligno-cellulose material and cereal flour extender components between the limits of 1 part of the resin solution to 6 parts of said extender components, to 8 parts of the resin solution to 1 part of the extender components, whereby there is produced an adhesive composition having liquid and solid phases, the solid phase of the adhesive composition having little tendency to separate from the liquid phase thereof, and the latter having little tendency to migrate from the glue line of the material to which the adhesive composition is applied.

13. An aqueous adhesive composition characterized by little tendency to separate and migrate comprising an extender base and a thermosetting phenol-aldehyde resin solution having adhesive properties, said resin solution containing resin solids between the limits of about 20% and 55%, said extender base comprising the reaction product of a conjointly cooked aqueous alkaline mixture of a ligno-cellulose material; a cereal flour; and an 8% to 20% aqueous solution of an alkali metal hydroxide; there being present in said mixture at least one part of cereal flour for each eight parts by weight of the ligno-cellulose material, said mixture having been cooked between the temperature limits of about 150° F. and about 212° F. for a period of time of at least about 5 minutes, said resin solution being present in the adhesive composition in an amount taken on the dry weight of the combined ligno-cellulose material and the cereal flour extender components between the limits of 1 part of resin solution to 6 parts of said extender components, to 8 parts of the resin solution to 1 part of the extender components.

14. An aqueous adhesive composition characterized by little tendency to separate and migrate comprising an extender base and a thermosetting phenol-aldehyde resin solution having adhesive properties, said resin solution containing resin solids between the limits of about 20% and about 55%, said extender base comprising the reaction product of a conjointly cooked aqueous alkaline mixture of a ligno-cellulose material; a cereal flour; and an 8% to 20% aqueous solution of an alkali metal compound selected from the group consisting of hydroxides, carbonates, a mixture of hydroxides and carbonates and bicarbonates; there being present in said mixture at least one part of cereal flour for each eight parts by weight of the ligno-cellulose material, said mixture having been cooked between the temperature limits of about 150° F. and about 212° F. for a period of time of at least 5 minutes, said resin solution being present in the adhesive composition in an amount taken on the dry weight of the combined ligno-cellulose material and cereal flour extender components between the limits of 1 part of the resin solution to 6 parts of said extender components, to 8 parts of the resin solution to 1 part of the extender components.

15. The aqueous adhesive composition recited in claim 14 in which the cereal flour is wheat flour.

16. The aqueous adhesive composition defined in claim 13 in which the phenol-aldehyde resin solution is a phenol-formaldehyde resin solution.

17. The method defined in claim 1 in which the ligno-cellulose material is selected from the group of materials consisting of tree bark, nut shells, and the endocarps of drupes.

18. The aqueous adhesive composition defined in claim 14 in which the phenol-aldehyde resin solution is a phenol-formaldehyde resin solution.

References Cited in the file of this patent

UNITED STATES PATENTS

| | | |
|---|---|---|
| 2,446,304 | Roman | Aug. 3, 1948 |
| 2,574,785 | Heritage | Nov. 13, 1951 |
| 2,580,890 | Clark | Jan. 1, 1952 |